(12) United States Patent
Groebner

(10) Patent No.: US 10,088,008 B2
(45) Date of Patent: Oct. 2, 2018

(54) ARRANGEMENT FOR TEMPORARY PRE-TENSIONING OF A TELESCOPING FORK

(71) Applicant: GROEBNER FERTIGUNGS GMBH, Petting (DE)

(72) Inventor: Andreas Groebner, Waging am See (DE)

(73) Assignee: GROEBNER FERTIGUNGS GMBH, Petting (DE)

( * ) Notice: Subject to any disclaimer, the term of this patent is extended or adjusted under 35 U.S.C. 154(b) by 0 days.

(21) Appl. No.: 15/611,119

(22) Filed: Jun. 1, 2017

(65) Prior Publication Data

US 2017/0350468 A1 Dec. 7, 2017

(30) Foreign Application Priority Data

Jun. 3, 2016 (DE) .................. 10 2016 110 340

(51) Int. Cl.
| F16F 9/56 | (2006.01) |
| B62K 25/06 | (2006.01) |
| B62K 25/08 | (2006.01) |
| F16F 9/54 | (2006.01) |
| B62K 25/04 | (2006.01) |

(52) U.S. Cl.
CPC .............. *F16F 9/56* (2013.01); *B62K 25/06* (2013.01); *B62K 25/08* (2013.01); *F16F 9/54* (2013.01); *B62K 2025/047* (2013.01); *F16F 2230/0005* (2013.01)

(58) Field of Classification Search
CPC ........ F16F 9/32; F16F 9/56; F16F 9/54; F16F 2230/0005; B62K 25/06; B62K 25/08; B62K 2025/047; B60G 17/005; B60G 17/88

See application file for complete search history.

(56) References Cited

U.S. PATENT DOCUMENTS

| 7,051,852 B2 * | 5/2006 | Maret ................. B60G 17/005 |
| | | 188/300 |
| 2006/0237273 A1 | 10/2006 | Maret |
| 2010/0252972 A1 * | 10/2010 | Cox ................. B60G 15/063 |
| | | 267/218 |
| 2012/0292148 A1 * | 11/2012 | Phipps ................. B62K 25/08 |
| | | 188/300 |
| 2014/0360827 A1 | 12/2014 | Phipps |
| 2016/0144926 A1 | 5/2016 | DeVol |

* cited by examiner

*Primary Examiner* — Melanie Torres Williams
(74) *Attorney, Agent, or Firm* — Ojeiku Aisiku; Robert V; Eckert Seamans Cherin & Mellot, LLC

(57) ABSTRACT

An arrangement for the temporary pre-tensioning of fork tubes (1, 2) of a telescoping fork, displaceable with respect to each other, comprises a base body (3) attached to a first fork tube (1) to secure and guide at least a first locking element (4) and a second locking element (5), whereby the locking elements (4, 5) interact with a receptacle element (6) attached to the second fork tube (2). A common actuation element (7) is provided within the housing of the base body (3) to actuate the locking elements (4, 5).

12 Claims, 9 Drawing Sheets

ARRANGEMENT FOR TEMPORARY PRE-TENSIONING OF A TELESCOPING FORK

BACKGROUND OF THE INVENTION

The present invention relates to an arrangement for temporary pre-tensioning of the fork tubes of a telescoping fork that are displaceable with respect to each other.

It is known from vehicle technology, for example off-road motorcycles, to temporarily pre-tension the fork tubes of a telescoping fork that may be displaced with respect to each other before the start of a race in order to improve the start condition at the starting line. For this, an arrangement is required to temporarily pre-tension the fork tubes and/or the telescoping fork.

For example, such an arrangement is known from patent document US 2006/0237273 A1 by means of which the telescoping fork is temporarily pre-tensioned. For this, a securing plate is attached to the first fork tube of the telescoping fork, and includes a receptacle for a locking pin that may engage with a slot of a ring attached to the second fork tube in order to temporarily hold the pre-tensioned telescoping fork in the pre-tensioned condition. The locking pin is guided into a receptacle of the securing plate. To actuate the locking pin, an assigned actuation knob is provided whose exterior thread is threaded into the interior thread of the locking pin. A spring element is also provided between the actuation knob and the locking pin that rests on the securing plate. Upon pressing of the actuation knob, the locking pin is locked within the slot of the ring attached to the second fork tube.

In order to be able to implement various pre-tension positions with the known arrangement, it is necessary to provide an additional locking pin and an additional actuation knob on an additional securing plate. For this, additional components beyond the additional locking pin and additional actuation knob with spring element are required to ensure proper function. The resulting design configuration of the known arrangement is therefore significantly complicated. Also, there is the problem that the locking pins and actuation knobs to actuate the locking pins are freely accessible so that on the one hand, undesired contamination is possible by means of which actuation of the locking pins may be blocked by the entrance of contaminating particles, and on the other hand, unintentional actuation is possible, which is a critical safety factor during vehicle operation.

SUMMARY OF THE INVENTION

A principal objective of the present invention is to provide an arrangement of the configuration described above that is of as simple a design as possible, and which is assembled with the fewest number of components and ensures safe operation.

This objective, as well as other objectives which will become apparent from the discussion that follows, are achieved, according to the present invention, by providing an arrangement for temporary pre-tensioning of fork tubes of a telescoping fork of an off-road motorcycle, or a similar vehicle or device, that may be displaced with respect to each other. The arrangement comprises a base body attached to a first fork tube to support and guide at least a first locking element and a second locking element, wherein the locking elements in their locked position interact with a receptacle element, or similar, attached to a second fork tube. In order to implement a simple design with as few components as possible and with positive function, a combined or common actuation element is provided to actuate the locking elements and/or locking pins within a housing of the base body.

In this way, several pre-defined pre-tensioning positions may be selected using a single actuation element since multiple locking elements are operated by this single actuation element. Also, undesired entry of foreign bodies such as contaminating particles is positively prevented by a housing sealed from the environment. The structure of the arrangement based on the invention provides a compact arrangement with small installation space required and with at least two pre-tensioning positions.

Per an advantageous expansion of the invention, it may be provided that the actuation element includes at least one shaft element and/or shaft section or similar that is preferably mounted crosswise to the direction of travel of the locking elements, and is mounted between the parallel locking elements within the housing of the base body so that it may rotate. Because of this central arrangement of the shaft element, both locking elements may be actuated based on the actuation direction of the actuation element. For this, an actuation rocker or similar may be provided to actuate the opposing locking elements located within the housing. A particularly technologically-advantageous embodiment of the invention may provide that the actuation rocker and an actuation lever are formed onto the shaft element, and thus the actuation element with the actuation lever and the actuation rocker is implemented with the shaft element as a single component. It is conceivable, however, that a multi-piece implementation might be used for specific applications, for example in order to implement additional locking elements.

Another expansion of the invention can provide that the actuation rocker includes matching receptacles or similar at least at the ends of the locking elements facing each other so that each locking element may be brought into its own position depending on the rotation direction because of the resulting pivoting motion of the actuation rocker. It is particularly advantageous for simply-designed cross-pins or similar to be provided for form-fitted engagement of the ends facing each other that may be connected to matching shaped cutouts of the actuation rocker.

It may advantageously be provided by the proposed arrangement that the first fork tube be implemented as a descending tube and that the second fork tube be implemented as a standing tube. In this context, the descending tube immerses itself within the standing tube in order to perform springing or damping motions. Thus, the base body is attached to the descending tube, and the receptacle cutout to engage the locking elements is attached to the standing tube. In the arrangement based on the invention, the standing tube is preferably mounted above, i.e., in the area facing the handlebar and the descending tube is mounted below, or in the area of the telescoping fork facing the vehicle wheel. Since the standing tube possesses a larger diameter than the descending tube, a greater degree of strength of the telescoping fork is ensured toward the handlebar.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
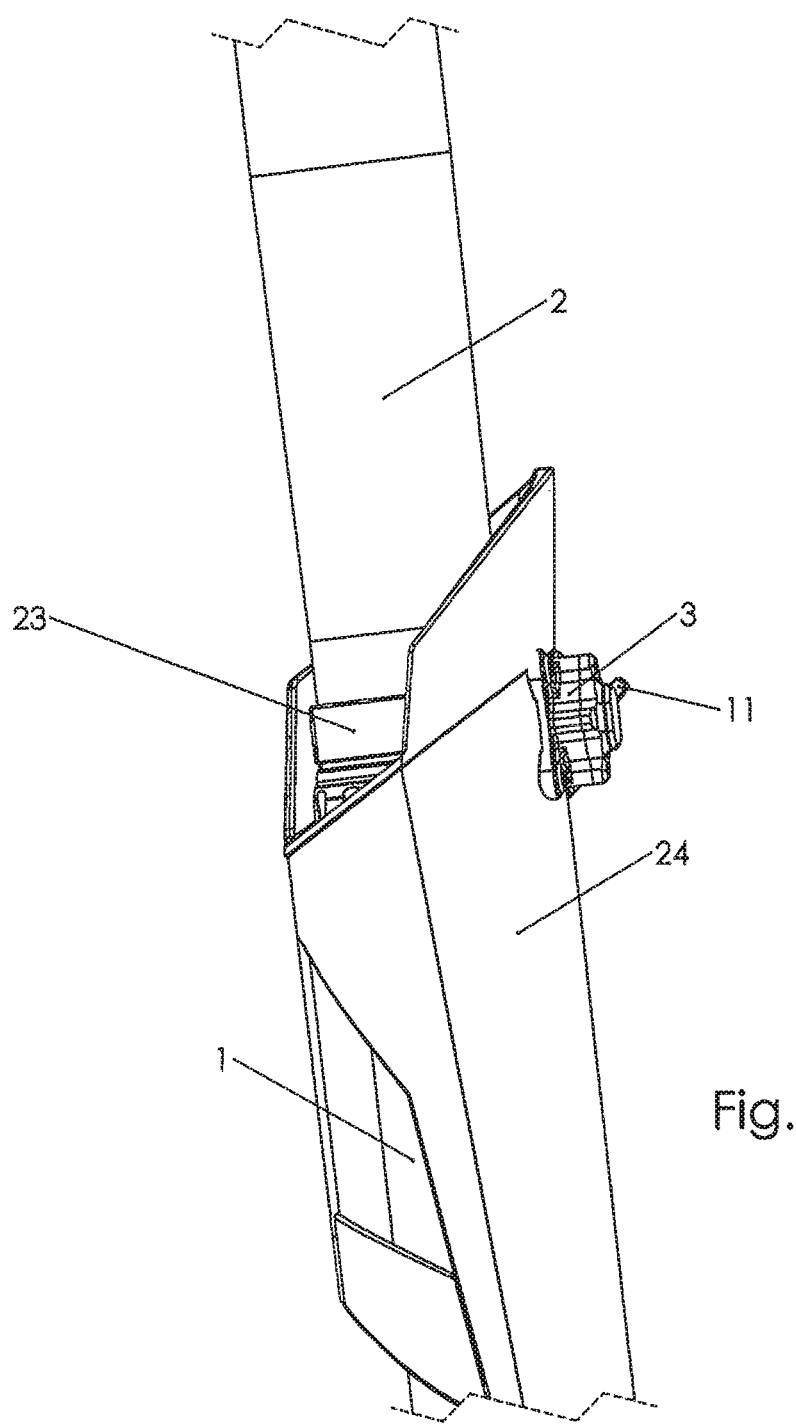
FIG. 1 is a schematic view of a potential embodiment example of an arrangement based on the invention for temporary pre-tensioning of fork tubes of a telescoping fork.

The preferred embodiments of the present invention will now be described with reference to FIGS. 1-9 of the drawings. Identical elements in the various figures are designated with the same reference numerals.

FIGS. 1 through 9 show examples of the arrangement based on the invention for temporary pre-tensioning of telescoping fork tubes 1, 2 of a telescoping fork that may be displaced with respect to each other, and that form the telescopic suspension and/or damping of an off-road motorcycle. Using the arrangement based on the invention, the fork tubes 1, 2 that may be displaced with respect to each other can be temporarily pre-tensioned for a pre-determined time period, for example during the start at the beginning of a race.

Figure 2:
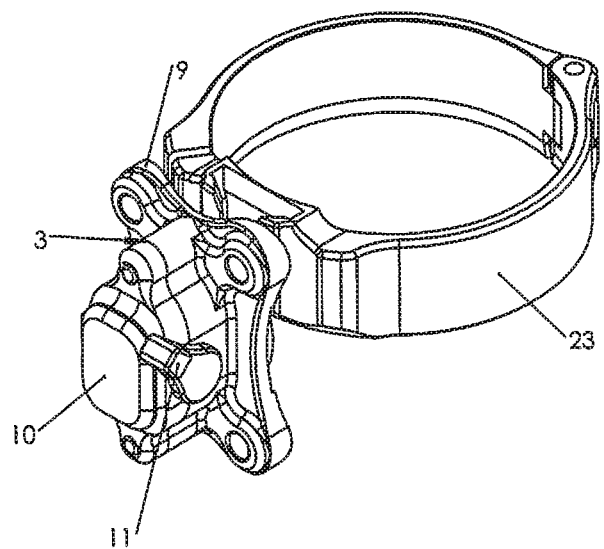
FIG. 2 is a schematic three-dimensional view of the arrangement based on the invention.

The arrangement comprises a base body 3 directly or indirectly attached to a first fork tube to support and guide at least a first locking element 4 and a second locking element 5. The locking elements 4, 5 are each in their locked position that correspond to a first and a second pre-tension position, and interact with a receptacle element 6 or similar attached to the second fork that is, for example, as FIG. 2 shows, connected by means of an attachment bracket 23 with the second fork tube 2 so that the fork tubes 1, 2 are pre-tensioned with respect to each other. Based on the invention, a common actuation element 7 is provided to actuate the locking elements 4, 5 within the housing of the base body 3.

The base body 3 is attached to the first fork tube 1 directly, or as FIG. 1 shows, indirectly through a fork protector 24, and includes a cover 10 attached to the base plate 9 to seal against the environment. The first fork tube 1 is implemented, for example, as a descending tube at the free end (not shown) to which the vehicle wheel is attached. The second fork tube 2 is implemented as a standing tube with a greater diameter than the descending tube for strength reasons, and is connected to the handlebar (not shown).

Figure 3:
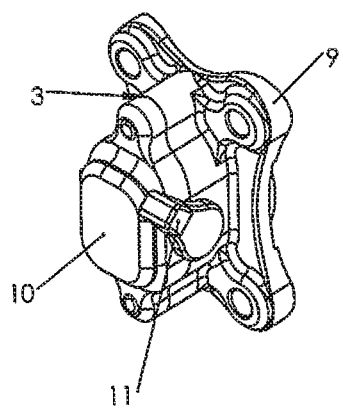
FIG. 3 is a schematic three-dimensional view of individual components of a base body for the arrangement.

The base plate 9 and cover 10 basically form the housing of the base body 3, and prevent intrusion of contaminating particles into the base body 3. FIG. 3 shows a view of individual parts of the base body 3 with the base plate 9 and cover 10.

The actuation element 7 comprises a shaft element 8 positioned crosswise to the direction of motion of the locking elements 4, 5 and mounted between the parallel-mounted locking elements 4, 5 within the housing of the base body 3 so that it may rotate. The shaft element 8 of the actuation element 7 includes an actuation lever 11 on its end outside of the housing of the base body 3 that is horizontal in the neutral position of the arrangement. Since an actuation lever 11 is used instead of an actuation knob in the arrangement based on the invention, unintentional actuation is prevented.

Figure 4:
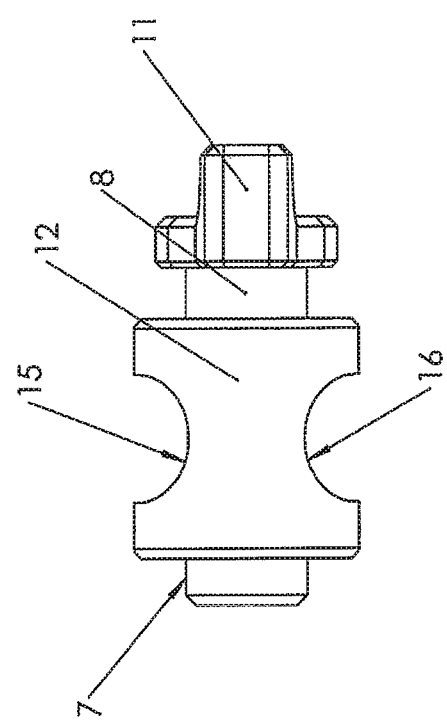
FIG. 4 is a top view of an actuation element of the base body of the arrangement.
Figure 5:
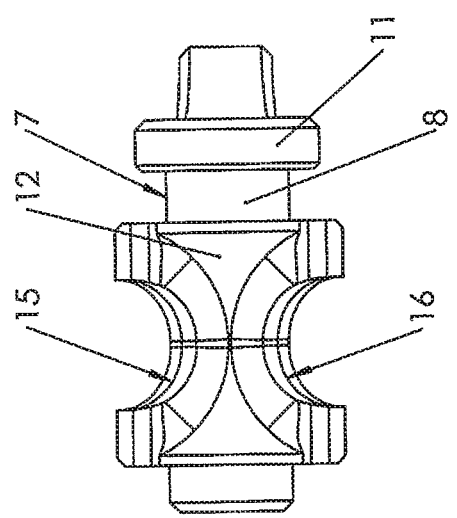
FIG. 5 is a bottom view of the actuation elements of the base body of the arrangement.
Figure 6:
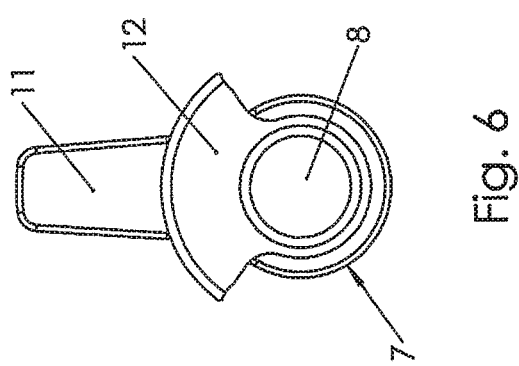
FIG. 6 is a lateral view of the actuation element of the base body of the arrangement.

An actuation rocker 12 to actuate the locking elements 4, 5 is provided in an area within the housing of the base body 3. The actuation rocker 12 is distinguished in that the rotating motion of the actuation lever leads to a pivoting motion of the actuation rocker 12 in order to actuate the locking elements 4, 5 in alternate directions. FIGS. 4 through 6 show individual parts of the actuation element 7 with shaft element 8 and actuation rocker 12. It is visible from these perspectives that the actuation rocker 12 is formed onto the shaft element 8, thus forming a one-piece actuation element 7.

Figure 7:
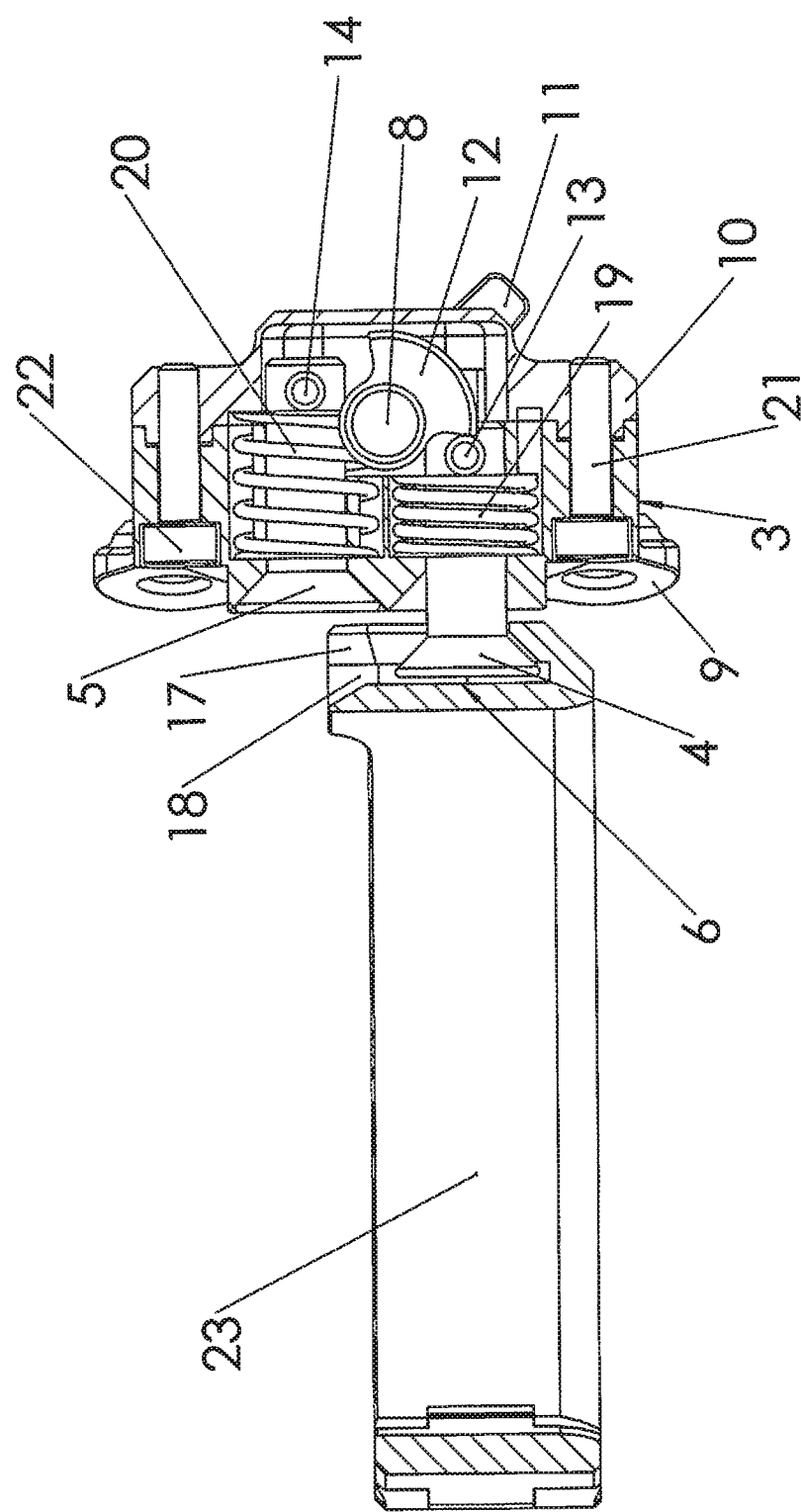
FIG. 7 is a cutaway view of the arrangement based on the invention in a first pre-tension position.
Figure 8:
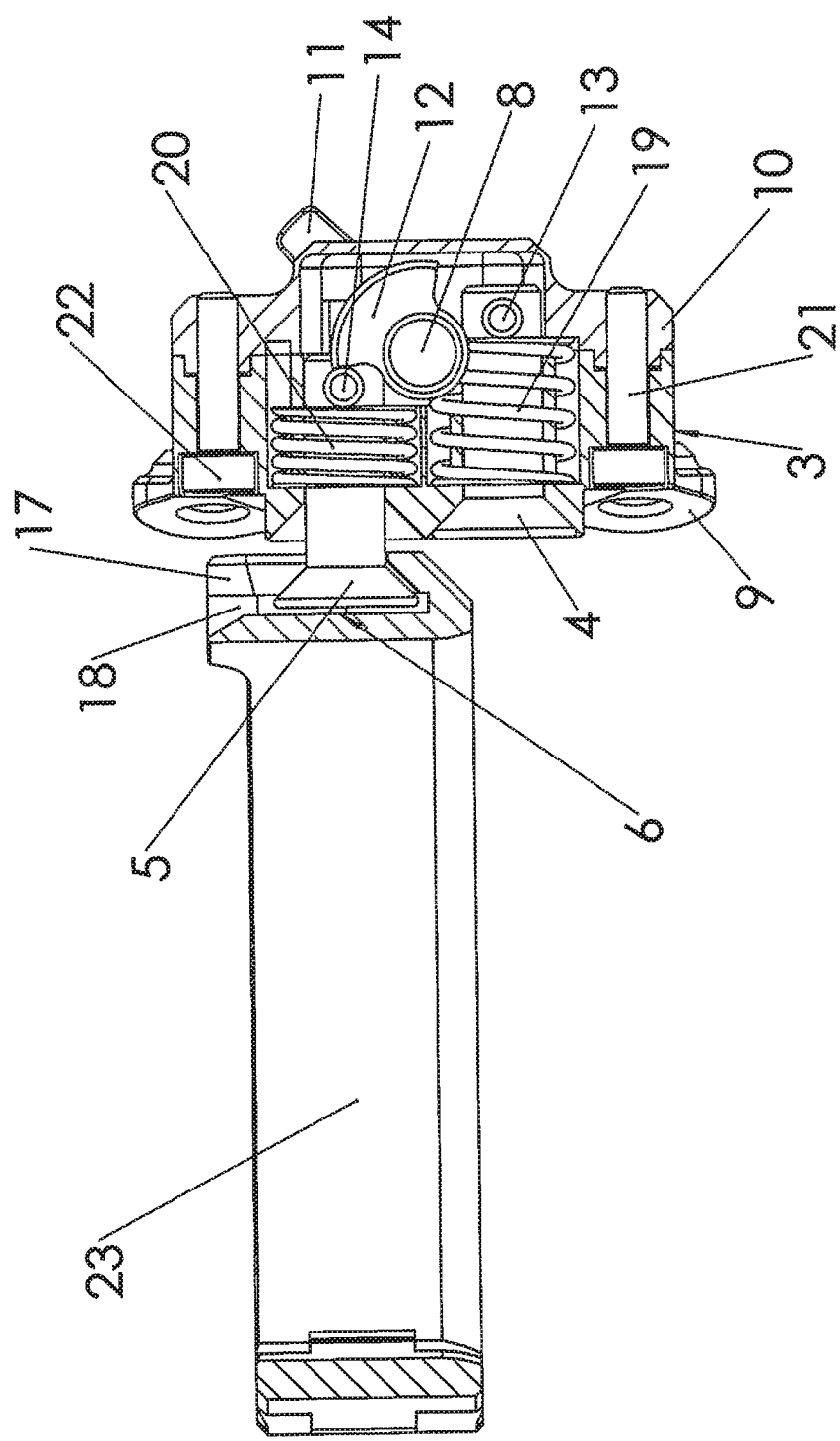
FIG. 8 is a cutaway view of the arrangement based on the invention in a second pre-tension position.
Figure 9:
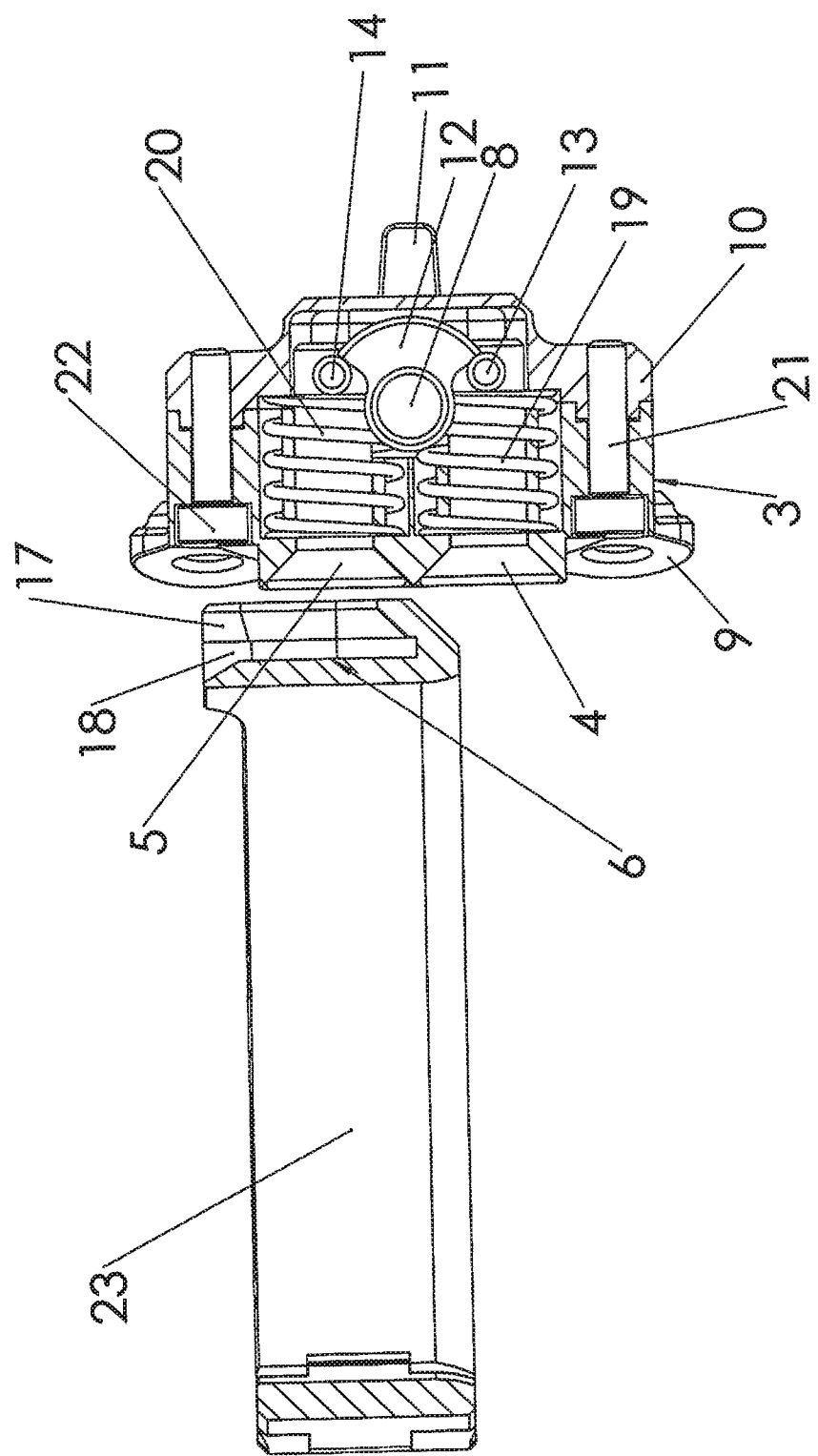
FIG. 9 is a cutaway view of the arrangement in a neutral position without pre-tensioning of the fork tubes.

The manner of function of the arrangement based on the invention is particularly visible in FIGS. 7 through 9. The locking elements 4, 5 are implemented as spring-loaded locking studs whereby the end facing the receptacle element 6 may be connected with the receptacle element 6 in order to hold the fork tubes 1, 2 in a pre-determined position. An increase in pre-tension releases the particular locking element 4, 5 again. The ends of each locking element 4, 5 within the housing of the base body 3 include a cross-pin 13, 14 to connect with the actuation element 7 and/or with the [actuation] rocker 12. The actuation rocker 12 includes matching positive-fit cutouts 15, 16 on at least the ends of the locking elements 4, 5 facing the cross-pins 13, 14 of the locking elements 4, 5 so that each locking element 4, 5 may be brought into the assigned first or second pre-tension position depending on the rotation direction of the shaft element 8 by means of the resulting pivoting motion of the actuation rocker 12. The design shape of the actuation rocker 12 is particularly shown in FIGS. 4 through 6.

FIG. 7 shows a condition of the arrangement in which the first locking element 4 is located in the first pre-tensioning position and/or locked position. For this, actuation of the actuation lever 11 of the actuation element 7 brings the actuation rocker 12 with its matching cutout 15 into a positive fit with the end and the assigned cross-pin 13 of the first locking element 4 so that the locking element 4 performs a longitudinal motion against the spring force of an assigned return spring 19, and is engaged in a rear-cut slot 18 of the receptacle element 6 with a positive fit, as shown in FIG. 7.

The slot 18 of the receptacle element [7] is formed to be open at one side so that the locking element 4 can extend upward from the opening of the slot 18 when pre-tension is increased, or when a relative motion of the fork tubes 1, 2 toward each other occurs, and can be returned to the neutral position again by means of the return spring 19. This condition is shown in FIG. 9, which shows the neutral position of the arrangement. The actuation lever 11 is horizontal in this condition. A guide bevel is provided at the open end of the slot 18 in order to simplify the insertion of the locking elements 4, 5.

The second pre-tension or locked position achieved after actuation of the second locking element 5 is shown in FIG. 8. The actuation of the first locking element 4 described above is identically applicable to the actuation of the second locking element 5. A return spring 20 is also provided for the second locking element 5 that enables the return motion after release from the slot 18 of the receptacle element 7. Furthermore, it is visible from FIGS. 7 through 9 that the base body 3 is attached using securing screws 21, 22 to the fork protector 24 and thus to the first fork tube 1. The receptacle cutout 6 is attached by means of a securing bracket 23 to the second fork tube 2, as is visible from FIG. 2, for example.

There has thus been shown and described a novel arrangement for temporary pre-tensioning of as telescoping fork which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

REFERENCE INDEX LIST 1 first fork tube
2 second fork tube
3 base body
4 first locking element
5 second locking element
6 receptacle element
7 actuation element
8 shaft element
9 base plate
10 cover
11 actuation lever
12 actuation rocker
13 cross-pin
14 cross-pin
15 cutout for positive fit receptacle
16 cutout for positive fit receptacle
17 rear cutout
18 slot
19 return spring
20 return spring
21 securing screws
22 securing screws
23 securing screws
24 fork protector

What is claimed is:

1. An arrangement for temporary pre-tensioning of fork tubes of a telescoping fork that are displaceable with respect to each other, having a base body attached to a first fork tube to secure and guide at least a first locking element and a second locking element, whereby the locking elements in their locked position interact with a receptacle element attached to a second fork tube, wherein a common actuation element is provided within a housing of the base body to actuate the locking elements.

2. Arrangement according to claim 1, wherein the actuation element includes a shaft element positioned crosswise to the direction of motion of the locking elements and mounted between the parallel-mounted locking elements within the housing of the base body such that it may rotate.

3. Arrangement according to claim 1, wherein the actuation element includes an actuation lever on the end outside the housing of the base body, and wherein the area of the actuation element within the housing includes an actuation rocker to actuate the locking elements.

4. Arrangement according to claim 1, wherein each locking element is implemented as a spring-loaded locking stud such that the end assigned to the receptacle element may be connected with the receptacle element and the fork tubes may be held in specified pre-tensioning positions and may be releasable again when the pre-tension amount is increased, and wherein the end of each locking element within the housing of the base body includes a cross-pin for connection to the actuation element.

5. Arrangement according to claim 3, wherein the ends of the actuation rockers on the sides facing the locking elements possess cutout sections providing a positive form fit so that each locking element may be brought into its locked or pre-tension position depending on the rotation direction of the shaft element by means of the resulting pivoting motion of the actuation rockers.

6. Arrangement according to claim 1, wherein the actuation element is provided with an actuation lever and also with a shaft element as a single component.

7. Arrangement according to claim 1, wherein the base body with a base plate is connected directly or indirectly to the first fork tube and wherein it includes a cover attached to the base plate to seal against the environment.

8. Arrangement according to claim 1, wherein the ends of the locking elements facing the receptacle element possess an area of increasing diameter, each of which is provided with a slot with rear cutout to hold the locked position or the pre-tension position using a positive fit.

9. Arrangement according to claim 8, wherein the slot of the receptacle element is open on one side.

10. Arrangement according to claim 1, wherein each locking element interacts with a return spring so that the locking element is returnable toward the base body.

11. Arrangement according to claim 1, wherein the receptacle element is attached to the second fork tube by means of a securing bracket.

12. Arrangement according to claim 4, wherein the ends of the actuation rockers on the sides facing the locking elements possess cutout sections providing a positive form fit so that each locking element may be brought into its locked or pre-tension position depending on the rotation direction of the shaft element by means of the resulting pivoting motion of the actuation rockers.

* * * * *